United States Patent
Keshtkarjahromi et al.

(10) Patent No.: US 11,308,040 B2
(45) Date of Patent: Apr. 19, 2022

(54) DISTRIBUTED SECURE EDGE STORAGE NETWORK UTILIZING COST FUNCTION TO ALLOCATE HETEROGENEOUS STORAGE

(71) Applicant: Seagate Technology LLC, Cupertino, CA (US)

(72) Inventors: Yasaman Keshtkarjahromi, Shakopee, MN (US); Mehmet Fatih Erden, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 191 days.

(21) Appl. No.: 16/669,696

(22) Filed: Oct. 31, 2019

(65) Prior Publication Data

US 2021/0133151 A1 May 6, 2021

(51) Int. Cl.
*G06F 16/182* (2019.01)
*G06F 16/903* (2019.01)

(52) U.S. Cl.
CPC ...... *G06F 16/182* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 5,742,814 A * | 4/1998 | Balasa | H04N 19/43 |
| 9,015,853 B2 | 4/2015 | Stefanov et al. | |
| 9,961,142 B2 | 5/2018 | Li et al. | |
| 10,965,448 B1 * | 3/2021 | Raman | G06F 9/5061 |
| 2019/0036648 A1 | 1/2019 | Yanovsky et al. | |
| 2019/0361988 A1 * | 11/2019 | Petters | G06F 16/182 |
| 2020/0153627 A1 * | 5/2020 | Wentz | H04L 9/3218 |

FOREIGN PATENT DOCUMENTS

WO   WO 2013191658 A1   12/2013

OTHER PUBLICATIONS

Yun Tian et al, "A Secure File Allocation Algorithm for Heterogeneous Distributed Systems", 2011 International Conference on Parallel Processing Workshops, pp. 168-175, IEEE 2011.*

* cited by examiner

*Primary Examiner* — Uyen T Le
(74) *Attorney, Agent, or Firm* — Mueting Raasch Group

(57) ABSTRACT

A set of N network-coupled edge storage nodes are selected to store a file of size |F|. The N edge storage nodes have heterogeneous storage availability and are ordered from a largest storage availability at the first edge storage node to a smallest availability at the $N^{th}$ edge storage node. A value Z<N is selected, such that an attacker having access to Z edge storage nodes is unable to decode any partial information of the file. The first through $Z+1^{th}$ edge storage nodes are assigned a same packet size. Keys are stored in the first Z edge storage nodes and independent linear combinations of the keys combined with partitions of the file are stored in the $Z+1^{th}$ to the $N^{th}$ edge storage nodes.

16 Claims, 13 Drawing Sheets

$$V = \begin{bmatrix} 1 & \alpha_1 & \alpha_1^2 & \cdots & \alpha_1^{Z-1} \\ & \vdots & & \ddots & \vdots \\ 1 & \alpha_R & \alpha_R^2 & \cdots & \alpha_R^{Z-1} \end{bmatrix} = \begin{bmatrix} 1 & 1 & \cdots & 1 \\ 1 & 2 & \cdots & 2^{Z-1} \\ \vdots & \vdots & \ddots & \vdots \\ 1 & R & \cdots & R^{Z-1} \end{bmatrix} \in \mathbb{F}_q{}^*$$

$$V = \begin{bmatrix} 1 & \alpha_1 & \alpha_1^2 & \cdots & \alpha_1^{Z-1} \\ & \vdots & & \ddots & \vdots \\ 1 & \alpha_R & \alpha_R^2 & \cdots & \alpha_R^{Z-1} \end{bmatrix} = \begin{bmatrix} 1 & 1 \\ 1 & 2 \\ \vdots & \vdots \end{bmatrix} \in \mathbb{F}_7$$

FIG. 18

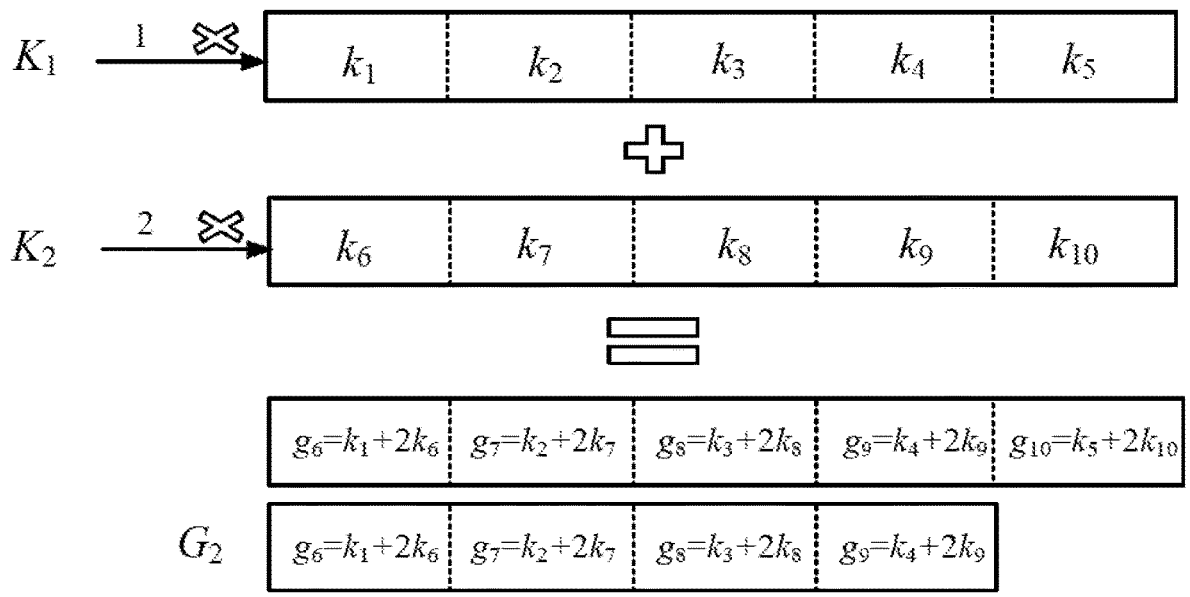

FIG. 19

$$V = \begin{bmatrix} 1 & \alpha_1 & \alpha_1^2 & \cdots & \alpha_1^{Z-1} \\ & \vdots & & \ddots & \vdots \\ 1 & \alpha_R & \alpha_R^2 & \cdots & \alpha_R^{Z-1} \end{bmatrix} = \begin{bmatrix} 1 & 1 \\ 1 & 2 \\ 1 & 3 \end{bmatrix} \in \mathbb{F}_7$$

FIG. 20

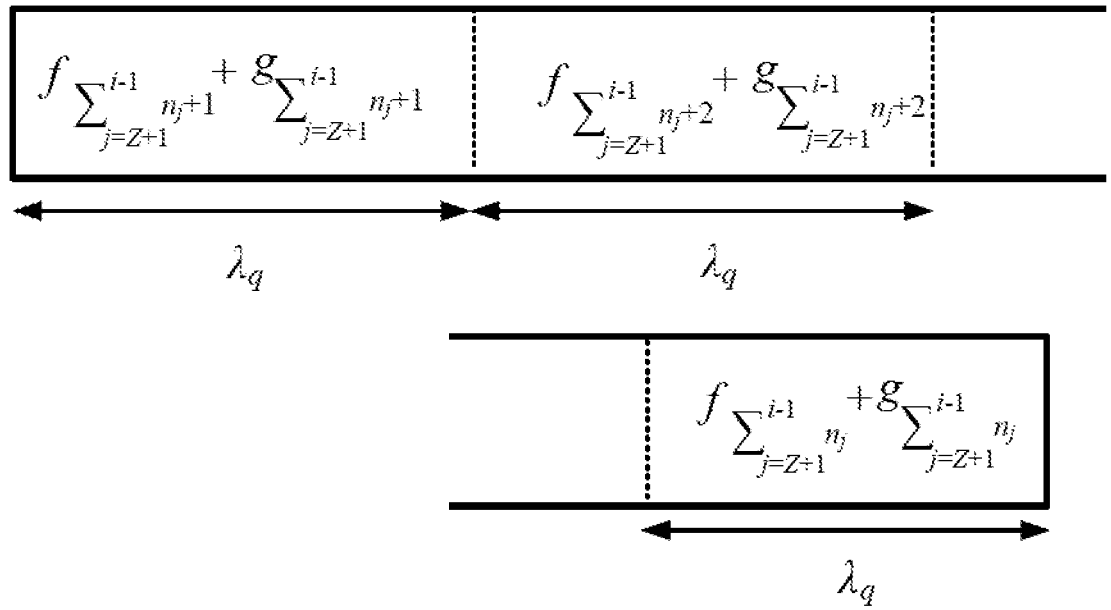
FIG. 23
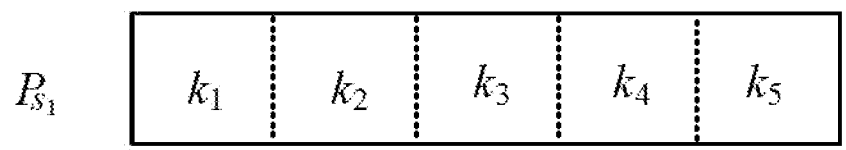
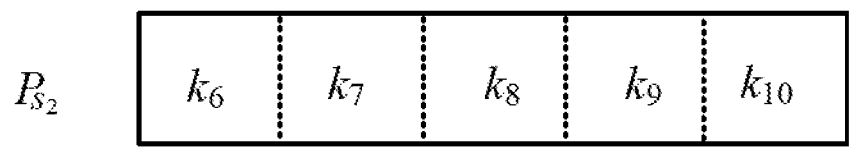
FIG. 24

DISTRIBUTED SECURE EDGE STORAGE NETWORK UTILIZING COST FUNCTION TO ALLOCATE HETEROGENEOUS STORAGE

SUMMARY

The present disclosure is directed to a distributed secure storage network utilizing a cost function to allocate storage. In one embodiment, a method involves selecting a value Z such that an attacker having access to Z storage nodes is unable to decode any partial information of a file of size |F| stored in a network that distributedly stores the file in more than the Z storage nodes. A number $N^*$ of the storage nodes is selected that minimizes a cost function that includes |F|, Z, an initial data access cost $C_T$, and a transmission and downloading cost $C_d$. Equal memory sizes are initially allocated from the $N^*$ of the storage nodes to store the file and a set of linear code keys. A first cost of adding more storage nodes to the $N^*$ storage nodes and a second cost of allocating more memory from a subset of the $N^*$ storage nodes are iteratively determined. Based on a minimal cost determined from the iterative determinations, the file and linear code keys are stored in $N \geq N^*$ of storage nodes, individual keys stored in a first through $Z^{th}$ storage nodes and independent linear combinations of the keys and partitions of the file stored in a $Z+1^{th}$ to $N^{th}$ storage node.

In another embodiment, N edge storage nodes that are coupled via a network are selected to store a file of size |F|. The N edge storage nodes have non-homogeneous storage availability and are ordered from a largest storage availability at the first edge storage node to a smallest availability at the $N^{th}$ edge storage node. A value $Z<N$ is selected, such that an attacker having access to Z edge storage nodes is unable to decode any partial information of the file. The first through $Z+1^{th}$ edge storage nodes have a same assigned packet size. Keys are stored in the first Z edge storage nodes and independent linear combinations of the keys combined with partitions of the file are stored in the $Z+1^{th}$ to the $N^{th}$ edge storage nodes.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 18 is a diagram a Vandermonde matrix is used in key generation according to another example embodiment;

FIG. 19 is a diagram showing key combinations according to an example embodiment;

FIG. 20 is a diagram a Vandermonde matrix is used in key generation according to an example embodiment;

FIGS. 21-24 are diagrams showing key combination and packetization according to an example embodiment.

DETAILED DESCRIPTION

The present disclosure generally relates to distributed data storage systems. Due to, among other things, the widespread adoption of mobile devices and the "Internet of things" (IoT), data is being generated exponentially. It is estimated by one source that data creation will grow to an enormous 163 zettabytes by 2025, which is ten times the amount of data created in 2017. This stored data can include large amounts of automatically generated data, e.g., data generated by sensors. The sensor data may include the raw data captured by end devices as well as the data generated as the result of analyzing the raw data. One solution for storing and analyzing large amounts of data involves transferring it to large data centers, which is commonly referred to as cloud storage.

Assuming network traffic grows exponentially, it may become increasingly difficult to send all of the created data to cloud for storage, especially for time-critical applications. In some emerging technologies, such as smart cities and autonomous cars, the data may need to be analyzed and stored in real-time, which may be difficult to do in the cloud. Among other things, cloud computing may be affected by relatively high latency (e.g., the cloud storage facility may be located a long distance from where the data is generated) as well as due to unpredictability of network connections (e.g., due to spikes in demands, outages, etc.).

Figure 1:
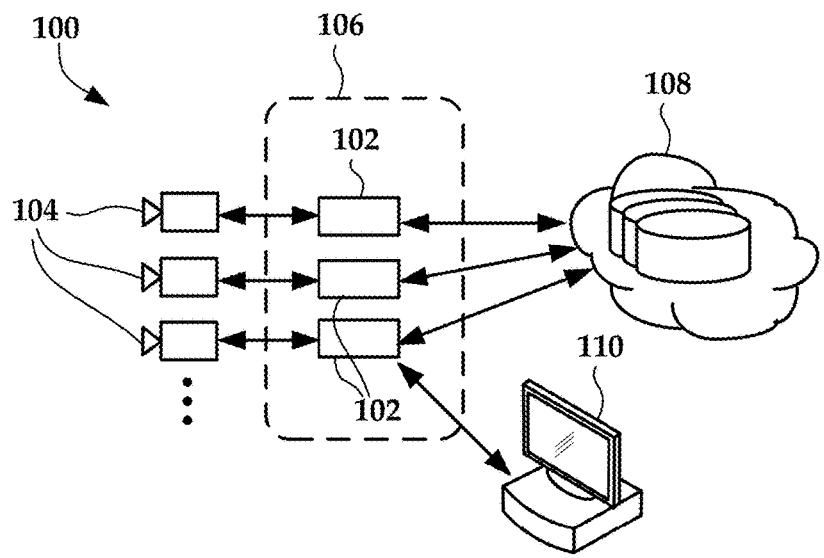
FIG. 1 is a block diagram of an edge storage system according to an example embodiment.

An alternative to analyzing dynamically generated sensor data in the cloud is using distributed edge storage, where a large portion of data F is divided into partitions and each partition is stored in an available edge device close to the data source. In FIG. 1, a block diagram shows an edge storage system 100 according to an example embodiment. A plurality of storage nodes 102 store data from sensors 104 (e.g., cameras) or some other data generator. Collectively, at least the storage nodes 102 form an edge layer 106 that are physically close to the sensors 104 and may also send some or all of the data to cloud storage 108. Note that the sensors 104 may also be considered part of the edge layer 106, and in some cases some or all of the sensors 104 may be integrated together with the storage nodes 102, e.g., within the same device.

Distributed edge storage provides data availability closer to where it is needed and reduces delay. For example, a user terminal 110 in proximity to the edge layer 106 may actively monitor the sensors 104 and/or storage nodes 102 looking for patterns and/or events that occur in near real-time. However, storing data on edge devices can risk data security.

For example, the edges devices may have limited capabilities (e.g., computation, memory) and therefore may not be able to implement multiple layers of security without unduly limiting performance. The edge devices may also not be under the control of a single entity, which can make enforcing security policies difficult. This disclosure describes a security scheme that addresses security challenges that are specific to edge devices, but that may be applicable to other devices, e.g., centralized distributed storage systems.

Figure 2:
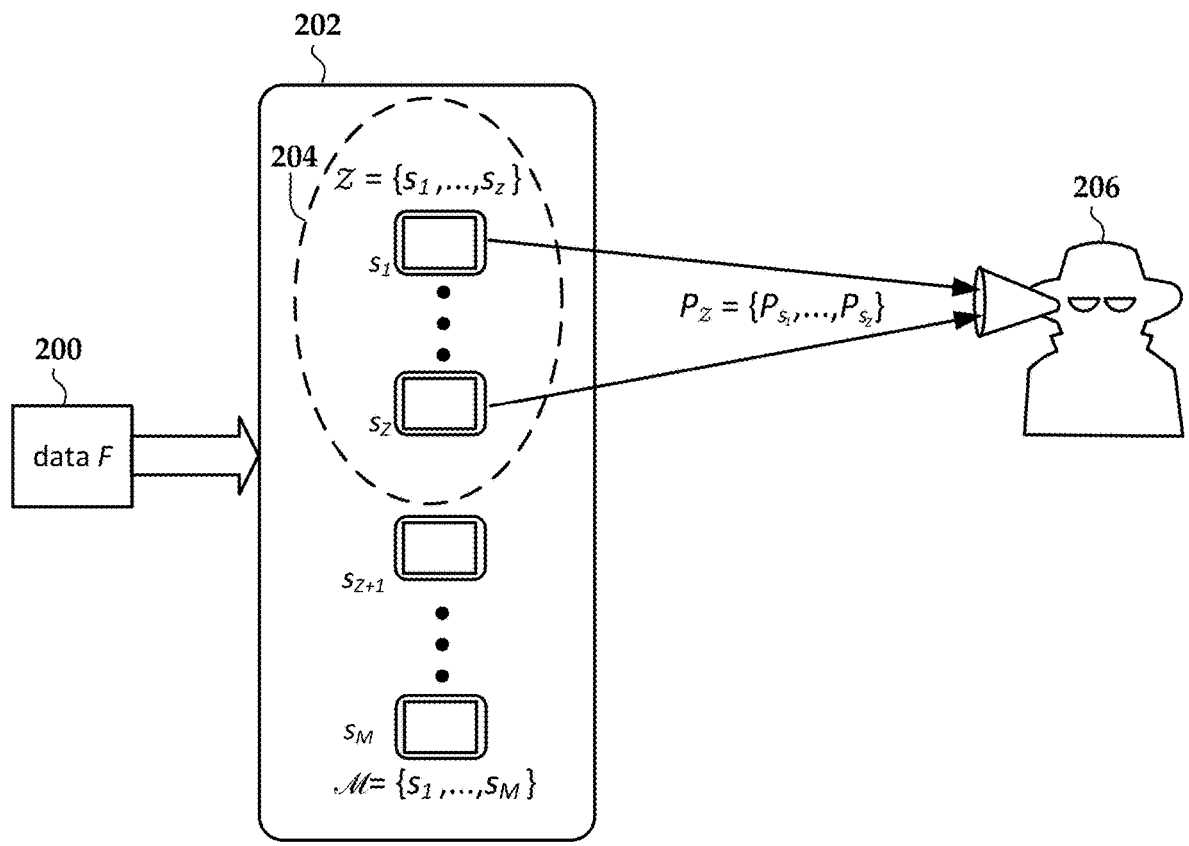
FIG. 2 is a block diagram of showing an eavesdropping scenario according to an example embodiment.

For distributed edge storage setup, one appropriate attack model is the case where a number of edge devices are compromised. More specifically, an eavesdropping attack is a scenario in which the attacker (eavesdropper) controls a group of edge devices and spies on the data stored in them. The goal is to keep data confidential from the devices under attack used as distributed storage nodes. An eavesdropping attack scenario according to an example embodiment is shown in the block diagram of FIG. 2.

Data 200 (e.g., a file F) is stored in a distributed manner among a group of edge storage nodes 202, which may be accessible via a network. An end user may desire to store the file F via a network connected computer device, such as user terminal 110 shown in FIG. 1. For purposes of this disclosure, a storage node is an independently operable, self-contained computing unit that includes at least some available storage. This independence means that an attacker 206 that has access to one storage node does not necessarily have access to other nodes that interoperate to store parts of the data 200. This is different than other distributed storage schemes such as a disk array where data file portions may be distributed among different disks. Generally, an attacker that can access one disk in array (e.g., by having access to the host computer or a storage controller card) can usually access all of the disks. Also note that the edge storage nodes 202 do not necessarily need to communicate with each other to achieve the distributed storage described herein, but all will generally be accessible by a single entity, e.g., an authorized user terminal.

In this example, a subset 204 of the edge storage nodes 202 can be accessed by the attacker 206 such that the attacker 206 can view the data of interest stored on the subset 204. For purposes of this disclosure, the value Z signifies the maximum number of nodes to which the attacker 206 has access. The system is designed such that the attacker 206 cannot read any partial information of the data file 200 with access to only Z nodes. An authorized user will have access to more than Z of the nodes and therefore can read the data file 200. In some embodiment, the authorized user will need access to all of the edge nodes 202 to read the data file 200.

Secret sharing schemes using linear coded keys address eavesdropping attacks, where data is divided into shares with equal sizes and each share is masked with linear coded keys and stored in one of the available storage nodes. For instance, assume there are M=4 available storage nodes of $\mathcal{M} = \{s_1, s_2, s_3, s_4\}$. Data F is first divided into two equal shares of $f_1$ and $f_2$, and keys $k_1$ and $k_2$ are generated. Then, the four packets of $P_{s_1} = k_1$, $P_{s_2} = k_2$, $P_{s_3} = f_1 + k_1 + k_2$, and $P_{s_4} = f_2 + k_1 + 2k_2$ are created and stored in the four storage nodes of $s_1$, $s_2$, $s_3$, and $s_4$. Note that the values of the packets are arithmetically combined as indicated and truncated to fit in the packets. This system setup keeps both shares $f_1$ and $f_2$ confidential from any Z=2 storage nodes that might be under an eavesdropping attack.

Figure 3:
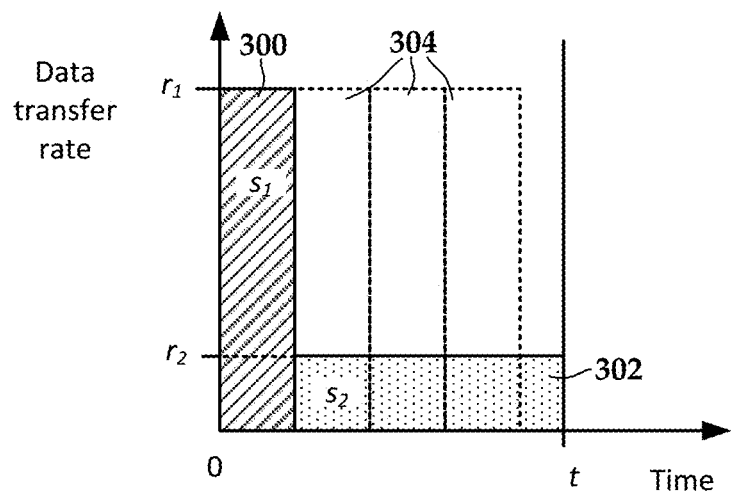
FIG. 3 is a block diagram showing node storage availability according to example embodiments.

The edge devices 202 are heterogeneous with different memory, compute, bandwidth, power, etc. Direct application of the existing secret sharing schemes yields poor performance for distributed edge storage as they do not take into account the heterogeneity of storage nodes. For example, if the four storage nodes $s_1$, $s_2$, $s_3$, and $s_4$ have different allocated storage availability, then the stored packets of $P_{s_1}$, $P_{s_2}$, $P_{s_3}$, and $P_{s_4}$ should have different sizes. For purposes of this disclosure, the term "storage availability" is used to describe the capability of a storage node to fulfill a request that meets some minimum requirement. The storage node should not only have the available capacity to store the data but should have performance when writing to and reading from the storage (which includes network communications) that satisfies a minimum standard defined for the system. In FIG. 3, a diagram shows how storage availability may be different for different storage nodes according to an example embodiment.

In FIG. 3, rectangles 300 and 302 represent data transfer over time for two different heterogeneous storage nodes $s_1$ and $s_2$. Node $s_1$ has a higher transfer rate $r_1$ than node $s_2$, which transfers data at rate $r_2$. A partition of size $|f|$ is available if the data storage node can transmit and receive the partition within time t. The area of blocks 300 and 302 are both of size $|f|$, thus both of these nodes have storage availability of at least one partition. As indicated by blocks 304, the node $s_1$ can theoretically have storage availability of four partitions of size $|f|$, assuming the node $s_1$ also has enough storage capacity available. In this example, even if node $s_2$ had a much higher storage capacity than node $s_1$, it would still have ¼ the storage availability.

In order for an entity to utilize heterogeneous edge storage nodes for secure storage, the entity may define, among other things, (i) how to select storage nodes among all candidates, (ii) how to partition file, (iii) how to generate the keys, and (iv) how to create packets to be stored in the selected storage nodes. These issues are addressed in this disclosure, as well as how the storage allocation can be optimized for cost.

Figure 4:
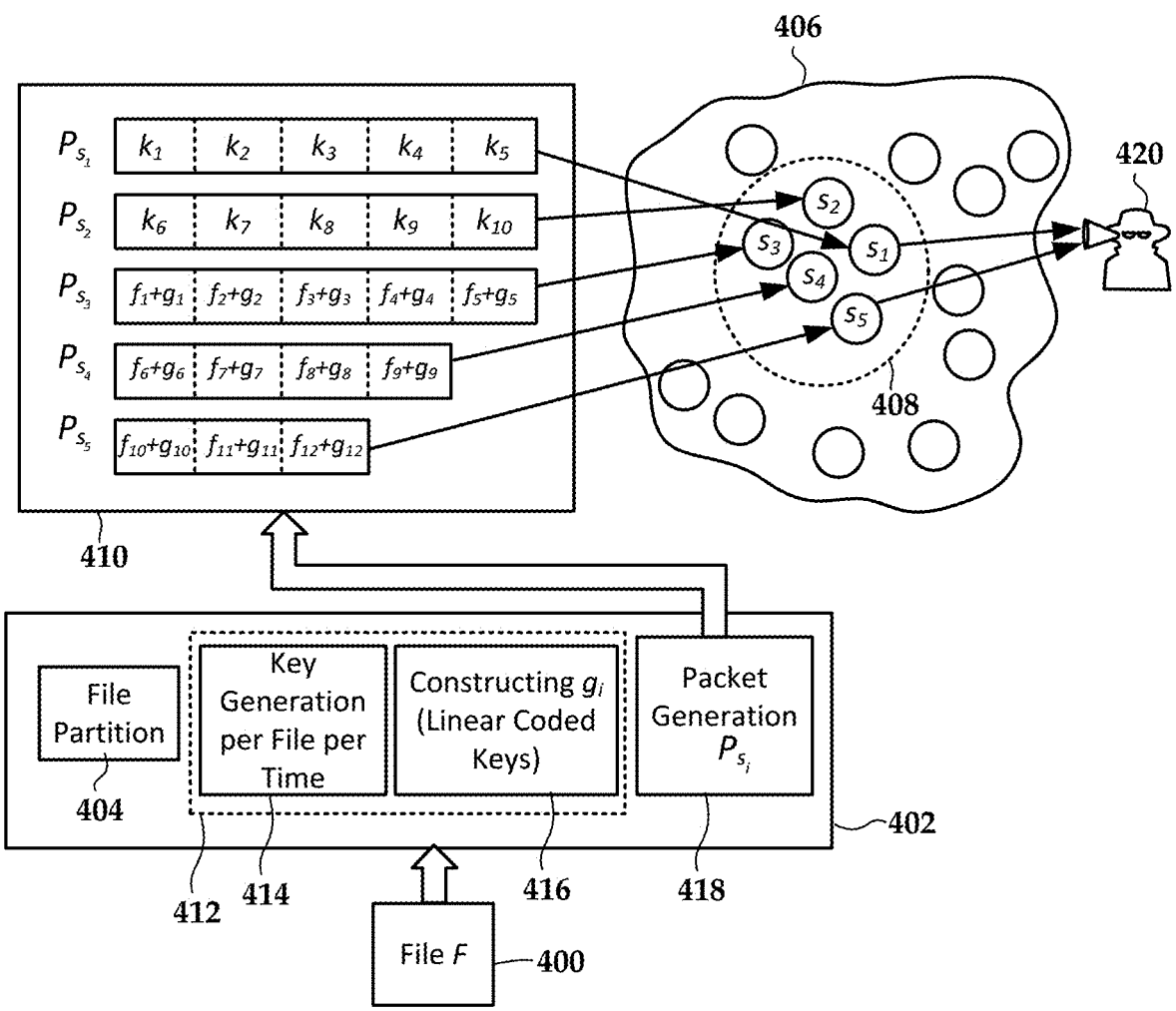
FIG. 4 is a block diagram showing a secure distributed edge storage scheme according to an example embodiment.

In FIG. 4, a block diagram shows a distributed edge storage scheme according to an example embodiment. A file 400 is processed by a storage processing unit 402, which may include conventional computing hardware such as processors, memory, input/output busses, etc., as well as specialized hardware, e.g., application-specific integrated circuits, digital signal processors etc. The storage processing unit includes functional units (e.g., software modules, logic circuits) such as a file partitioner 404 that may be configured to query an edge network 406 of edge storage nodes to determine storage availability of the individual storage nodes. Using techniques that will be discussed below, the partitioner selects a subset 408 of the nodes and creates a definition 410 of the storage configuration for the file 400. This definition 410 includes identification of the selected storage nodes, the partition/packet size on each node, the arranged of data and keys in each partition, etc.

A key generation section 412 includes a module 414 that generates a key set for the file 400 and a module 416 that linearly combines the keys of the set into linear coded keys, $g_i$'s. A packet generation module 418 uses the definition 410 and the linear coded keys to generate and store the file 400 on the network 406. A similar set of modules may be used to read data from the network 406, based on the definition 410, download the partitions/packets, unencrypt the partitions/packets, and reassemble the file.

Each packet is created using the file partitions and the generated keys. The file partitioner 404 uses the available heterogeneous resources efficiently such that the designed distributed edge storage system is secure against an eavesdropper adversary 420 attacking at most Z storage nodes. Consider a system model where there are M heterogeneous edge devices that can be used as distributed storage nodes. The set of all candidate storage nodes in network 406 is denoted by $\mathcal{M} = \{s_1, s_2, \ldots, s_M\}$. A subset 408 of all M available storage nodes are selected to be used for securely storing data F.

The set of selected storage nodes is denoted by $\mathcal{N} = \{s_1, s_2, \ldots s_N\}$, where $N \leq M$. Then, the set of packets $\mathcal{P}_\mathcal{N} = \{P_{s_i}, i \in \mathcal{N}\}$ are created to be stored in the set 408 of the selected storage nodes, where $P_{s_i}$ is stored at storage $s_i \in \mathcal{N}$. It is assumed that the system is vulnerable to an attack, where the capability of the attacker 420 is characterized in terms of parameter $Z < N$. More specifically, the attacker can have access to the data stored in at most Z storage nodes. However, the information on which storage nodes are under attack, is not known at the defender side, therefore, the goal is to make the data F confidential from any Z storage nodes. The value of Z can also be considered as a security parameter where higher values of Z provides more security to the system and smaller values of Z makes the system more vulnerable to an attack.

From the defender point of view, a more robust system with larger values of Z comes with the cost of an increase in the storage usage (increase in the number of distributed storage nodes) and an increase in the complexity of designing the secure system. In other words, parameter Z can be considered as a tradeoff between providing more security and the increase in the complexity of system by taking into account the vulnerability state of the system to an attack.

One goal is to store the data such that the attacker cannot get any meaningful information about data. More specifically, the proposed solution provides information theoretic secrecy defined as $H(F|\mathcal{P}_Z) = H(F)$, where $H(.)$ is the information theory entropy and $\mathcal{P}_Z$ is the data stored in any storage set $\mathcal{Z} \subset \mathcal{N}$ with size Z, ($|\mathcal{Z}| = Z$). One of the applications of information theoretic secrecy is where a linear combination of the data partitions can reveal some meaningful information about the whole data set. In the proposed method, any linear combination of the data partitions are kept confidential from any subset of storage nodes of quantity Z. An authorized user can extract the data F by having access to all of the packets stored in the storage set $\mathcal{N}$.

In this disclosure, features are described that assist in reducing computational complexity at the design stage as well as reducing computational complexity and communication cost for an authorized user at the stage of retrieving data. In reference again to FIG. 4, the subset of all candidate storage nodes is selected to distributedly store file F. The selected storage set should satisfy the minimum requirements to provide security. In the second step, the file F is divided into partitions. In the third step, keys are generated and $g_i$'s are constructed as the linear combinations of the generated keys, where $g_i$ values are used to mask the file partitions. In the fourth step, the file partitions and the constructed $g_i$'s are used to generate packets and store them in the set of selected storage nodes. The details of each step along with a complementary example are described below.

Storage Selection

In order to provide security, the file partitions are masked with keys and thus some of the available memory resources should be allocated to store keys. The minimum requirement to satisfy the information theory privacy for storing a file partition f in a storage node is to mask it with a random key that has the same size as f, e.g., f+k, where $|k|=|f|$. In addition, to keep data confidential from any Z storage nodes, the packets stored in any Z storage nodes should be linearly independent. For this constraint to be satisfied, one requirement is that for any stored packet $P_{s_i}$ (stored in storage $s_i$) with size $|P_{s_i}|$, there should be at least Z other stored packets (each stored in another storage) with size greater than or equal to $|P_{s_i}|$. In other words, if the storage nodes are ordered in the order of descending allocated storage sizes such that $|s_1| \geq |s_2| \geq \ldots |s_N|$, one minimum requirement is that the packets stored in the first Z+1 storage nodes have the same size. In addition, any Z storage nodes should contain linearly independent packets.

Therefore, the first requirement for the storage selection is $\sum_{i=Z+1}^{N} |s_i| = |F|$, where $|F|$ is the size of file F. The other requirement is that the total allocated storage size over all storage nodes should be equal to $\sum_{i=1}^{N} |s_i| = \sum_{i=1}^{Z} |s_{Z+1}| + \sum_{i=Z+1}^{N} |s_i| = Z|s_{Z+1}| + |F|$. This means that for allocating data F, distributedly, $Z|s_{Z+1}|$ extra memory is required that is used to store keys and keep data secure. However, for an authorized user to be able to retrieve data F, it should have access to the data stored in all storage nodes and download them, then it should subtract the key parts and extract the useful information F.

The cost for the authorized user to retrieve data from N storage nodes is a function of number of storage nodes as well as other parameters such as type of storage, bandwidth, power, etc., which are different for different storage nodes. The set of selected storage nodes should be chosen to minimize the cost. Even if the storage nodes are homogeneous in terms of type of storage, bandwidth, and power, but heterogeneous only in terms of available storage size, minimizing cost is still not trivial. In the following, an optimized set of selected storage nodes is found by focusing on optimizing the cost for this simplified scenario using Equation (1) below:

$$\text{cost} = NC_T + (Z|P_{s_{Z+1}}| + |F|)C_d \qquad (1)$$

As seen in Equation (1), cost includes two parts: (i) $NC_T$, where $C_T$ is the initial cost for accessing the data stored at each storage node and $NC_T$ is the total cost over all storage nodes, and (ii) $(Z|P_{s_{Z+1}}| + |F|)C_d$, where $C_d$ is the transmission and downloading cost for one piece of information and the total cost for all data is $(Z|P_{s_{Z+1}}| + |F|)C_d$. Generally, $C_T$ includes actions such as network discovery, setting up and releasing connections, etc. Note that in the simplified model, $C_T$ and $C_d$ may be considered constant for each candidate storage node. In some variations, $C_T$ and $C_d$ may be different for each node, such that the cost values in Equation (1) are averages, more specifically, for $C_d$ it is weighted average $C_d = (\sum_{i=1}^{N} |P_{s_i}| C_{d,i}) / \sum_{i=1}^{N} |P_{s_i}|$ and for $C_T$ it is the average $C_T = (\sum_{i=1}^{N} C_{T,i}) / N$, where $|P_{s_i}|, C_{d,i}$ and $C_{T,i}$ are the downloading and initial cost values of the $i^{th}$ storage node.

The goal is to select the set of storage nodes $\mathcal{N}$ such that the cost defined in Equation (1) is minimized. To tackle this problem, the effect of $|P_{s_{Z+1}}|$ on cost in Equation (1) is determined, and then a lower bound on cost is found and the corresponding optimized value of N. $|P_{s_{Z+1}}|$ is equal to the largest portion of file F that is masked with keys and stored at storage $s_{Z+1}$ among all packets stored at all storage nodes. In order to reduce cost, $|P_{s_{Z+1}}|$ should be selected as small as possible. On the other hand, as will be explained later in "File Partition" section, the file partitions are distributed among the last N−Z storage nodes, therefore, the minimum size for the largest portion is equal to $|F|/(N-Z)$, which is the case when the file partitions are equally distributed among the last N−Z storage nodes. This may not always be possible as the storage nodes containing different portion of file partitions are heterogeneous with different $|s_i|$ and thus different $|P_{s_i}|$. However, this can provide a lower bound on cost, as shown in Equation (2) below.

$$\text{cost} \geq NC_T + \left(\frac{Z|F|}{N-Z} + |F|\right)C_d \quad (2)$$

As seen in Equation (2), by increasing N, the first part of the lower bound increases and the second part decreases. Therefore, there is an optimum value for N that minimizes the lower bound, which can be calculated as shown in Equation (3) below, where N* is rounded to the optimized integer. Specifically, $N_1$ is N* rounded to the nearest larger integer and $N_2$ is N* rounded to the nearest smaller integer.

$$N^* = \begin{cases} N_1 = \left\lceil \sqrt{\frac{Z|F|C_d}{C_T}} + Z \right\rceil, & N_1 C_T + \left(\frac{Z|F|}{N_1 - Z} + |F|\right) < N_2 C_T + \\ & \left(\frac{Z|F|}{N_2 - Z} + |F|\right) \\ N_2 = \left\lfloor \sqrt{\frac{Z|F|C_d}{C_T}} + Z \right\rfloor, & \text{Otherwise} \end{cases} \quad (3)$$

Figure 5:
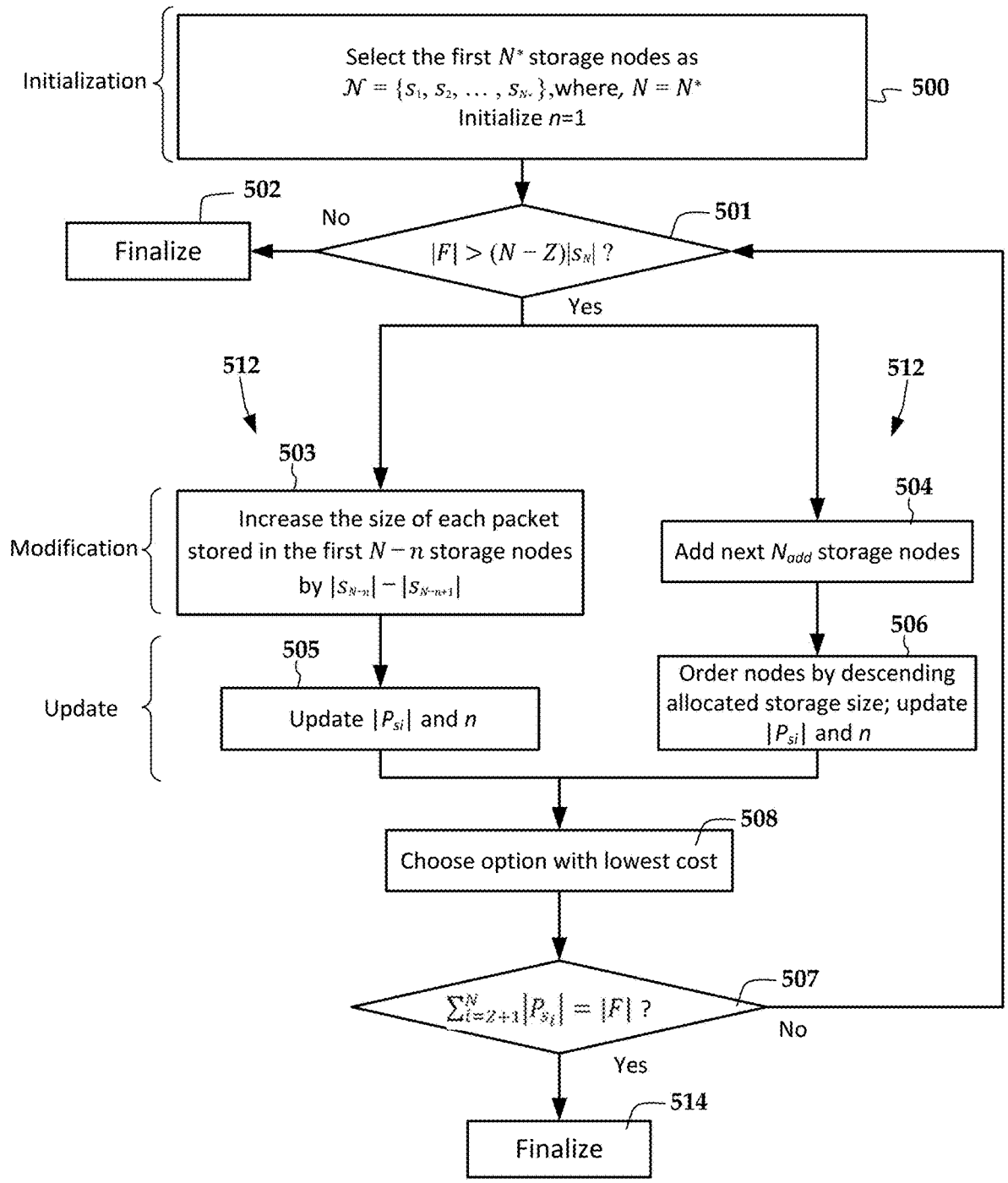
FIG. 5 is a flowchart showing selection of nodes according to an example embodiment.

The cost with the optimized calculated number of storage nodes N* is larger than the calculated lower bound in Equation (2), when the edge devices are heterogeneous. However, this clue can be used to select the set $\mathcal{N}$ for heterogeneous distributed edge storage. The strategy is to initially use equal memory sizes from the first N* storage nodes (the storage nodes with the largest available storage sizes) and if more memory is required for storing F, then iteratively decide to either (i) add more storage nodes or (ii) use more memory from each available storage. The decision between these two options is made based on minimizing the cost. The details are provided below and generally illustrated in FIG. 5, which is a flowchart showing selection of nodes according to an example embodiment. Note that $|s_i|$ represents the maximum available memory size at storage $s_i$ and $|P_{s_i}|$ represents the memory size used from storage $s_i$ to store a portion of file F, packet $P_{s_i}$.

An initialization 500 of the storage selection involves selecting the first N* storage nodes as $\mathcal{N} = \{s_1, s_2, \ldots, s_{N^*}\}$ after ordering the nodes in the descending available storage sizes, where, N=N*. The maximum size of file F that can be equally and distributedly stored in these storage nodes is $(N-Z)|s_N|$. Therefore, if it is determined 501 the size of file F is larger than this, then the "Modification" stage is entered, where either 510 more of storage nodes are added or 512 more memory from the available storage nodes $\mathcal{N}-N$ is used. If the size of the file F is less than what is available in the first N* storage nodes, the set of initially selected storage nodes is finalized 502 as $\mathcal{N} = \{s_1, s_2, \ldots, s_{N^*}\}$ with N=N*, where the size of each packet stored in each storage $s_i$ is equal to $|P_{s_i}|=|s_{N^*}|$, $1 \leq i \leq N^*$.

The Modification stage involves determining one of these options 510, 512 with the minimum cost is selected. For the Modification stage, info=$(N-Z-n)(|s_{N-n}|-|s_{N-n+1}|)$ more information can be added to the distributed storage system by (i) increasing 503 the size of each packet stored in the first N-n storage nodes by $|s_{N-n}|-|s_{N-n+1}|$, with the update $|P_{s_i}|=|P_{s_i}|+|s_{N-n}|-|s_{N-n+1}|$, $1 \leq i \leq N-n$, or (ii) adding 504 the next $N_{add}$ storage nodes, such that $\Sigma_{i=N+1}^{N+N_{add}}|s_i| \geq \text{info}$. Note that n was initialized to n-1 at step 500, and $N_{add}$ should be as small as possible to reduce the increase in the cost. Each option 503, 504 adds a different cost. More specifically, the first option increases the cost by $\text{cost}_{add,1}=Z(|s_{N-n}|-|s_{N-n+1}|)C_d$, as the size of $|P_{s_{Z+1}}|$ is increased by $(|s_{N-n}|-|s_{N-n+1}|)$ in Equation (1) and the second option 504 increases the cost by $\text{cost}_{add,2}=N_{add}C_T$, as the number of storage nodes is increased by $N_{add}$ in Equation (1). Depending on the system parameters, the option with the lower cost is selected (see operation 508).

Note that if info=$(N-Z-n)(|s_{N-n}|-|s_{N-n+1}|)$ is equal to 0, the first option 503 is not available and thus the second option 504 is selected by adding as many additional storage nodes as required such that info=$|F|-\Sigma_{i=Z+1}^{N}|P_{s_i}|$ and $\Sigma_{i=N+1}^{N+N_{add}}|s_i| \geq \text{info}$. After this selection, the variables are updated as shown in operation as detailed in the Update stage seen in FIG. 5.

After the Modification stage, which involves modifying the size of memory used from each storage or the set of selected storage nodes, then parameters should be updated. If first option 503 is selected in the Modification stage, update 505 involves updating the parameter $|P_{s_i}|$, $\forall 1 \leq i \leq N-1$ and parameter n as n=n+1. If the second option 504 is selected in the Modification stage, the set of selected storage nodes should be updated 506 by ordering by descending allocated storage size and adding the $N_{add}$ storage nodes to the set of selected storage nodes $\mathcal{N} = \mathcal{N} + \{s_i\}_{i=N+1}^{N+N_{add}}$, $N=N+N_{add}$. In addition, $|P_{s_i}|$, $\forall N-N_{add}+1 \leq i \leq N-1$, should be set as $|P_{s_i}|=|s_i|$. Note that depending on the amount of info, $|P_{s_i}|$ might be selected such that not all available size of storage $s_N$ is used, i.e., $|P_{s_N}| \leq |s_N|$. Furthermore, the parameter n should be updated as $n=n+N_{add}$.

Figure 6:
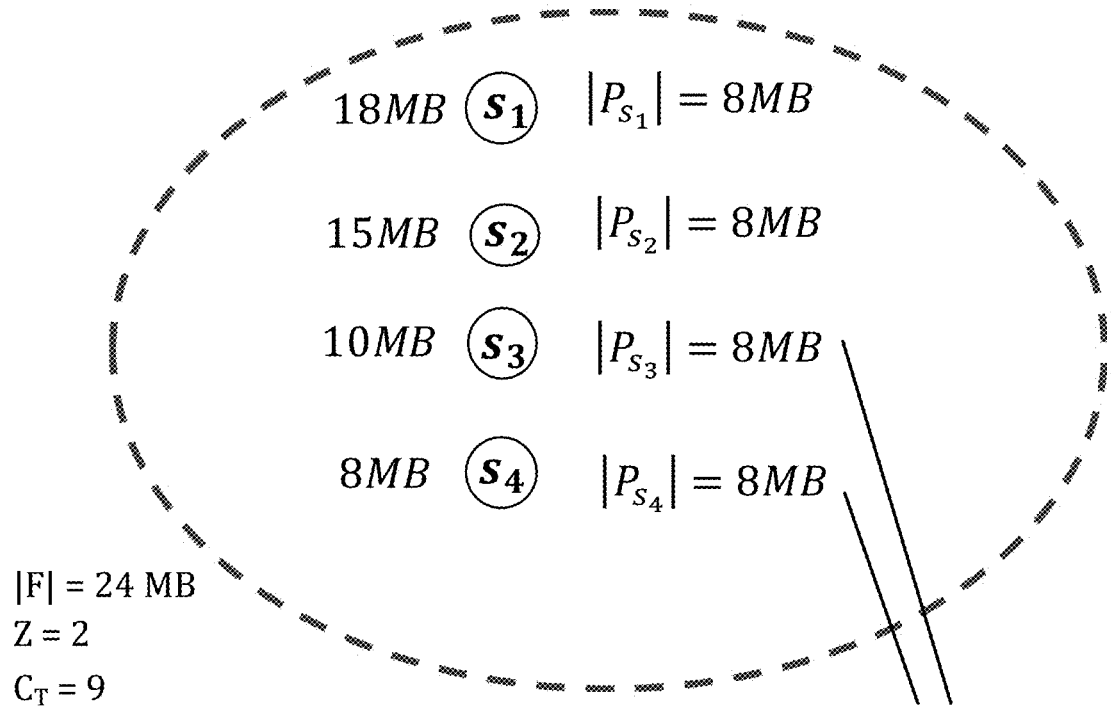
FIGS. 6-8 are block diagrams showing selection of storage nodes according to an example embodiment.
Figure 7:
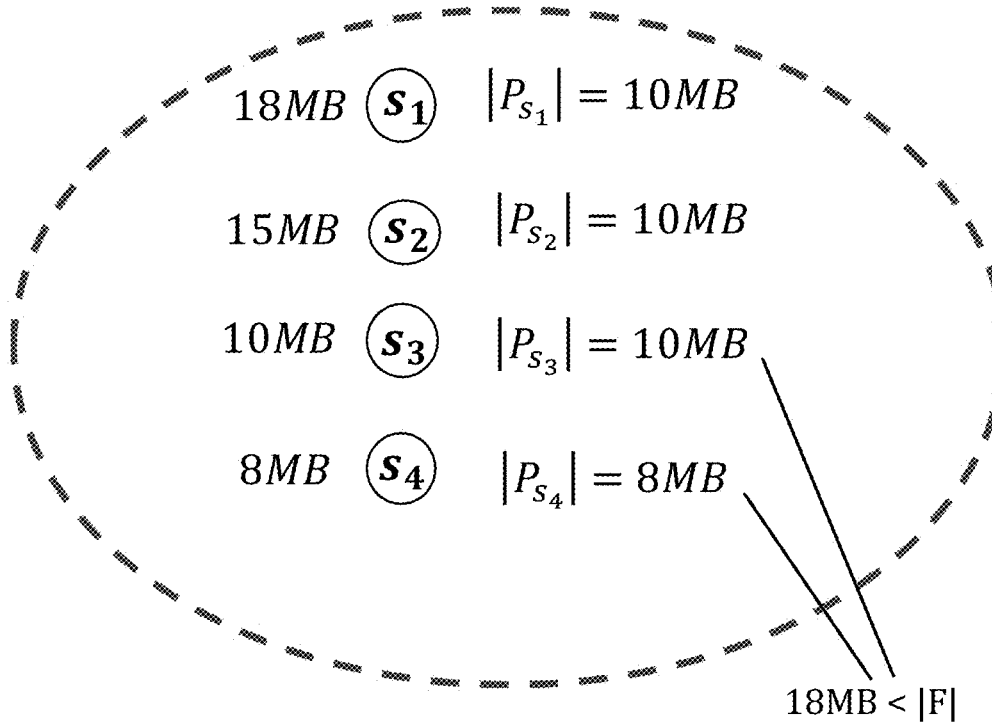
Figure 8:
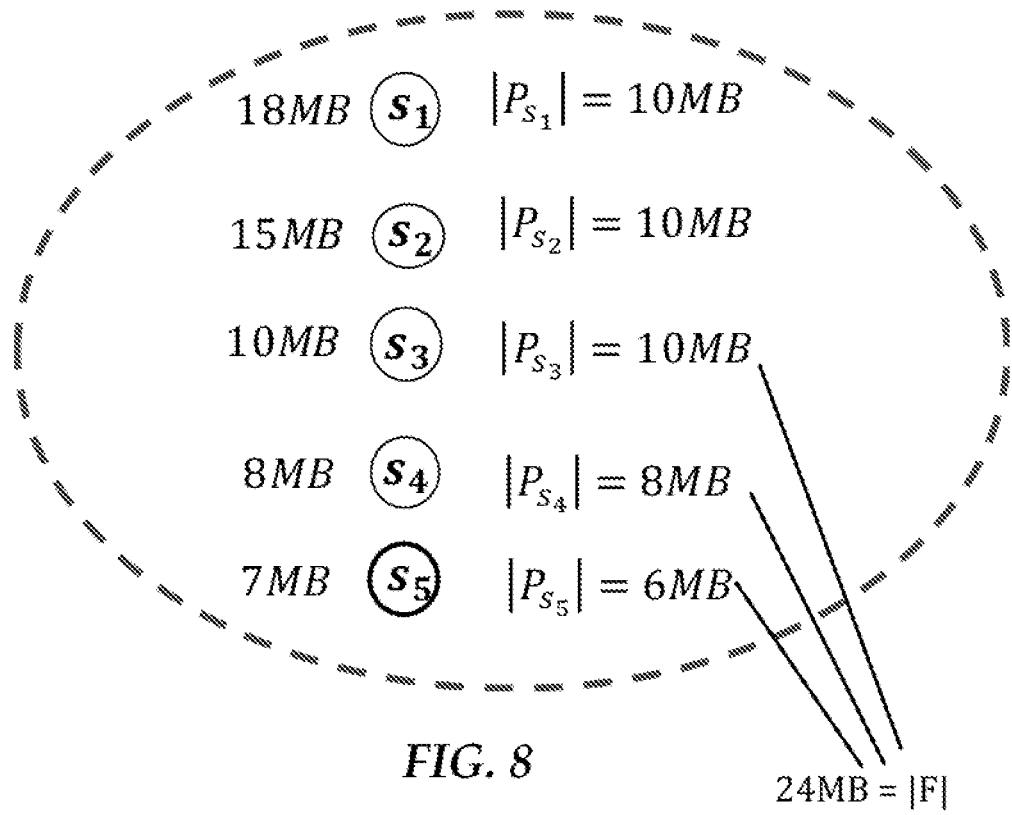

After making the required updates, if the condition 507 $\Sigma_{i=Z+1}^{N}|P_{s_i}|=|F|$ is not still met for the lowest-cost option, the stages "Modification" and "Update" can be sequentially repeated until the condition is met. When the condition 507 is satisfied, the storage configuration is finalized 514 similar to the finalization 502, but using the nodes and packet sizes determined in the Modification" and "Update" stages. In FIGS. 6-8, diagrams show selecting storage nodes according to an example embodiment using the method summarized in FIG. 5. In this example, the data file F has size |F|=24 MB and is to be stored in distributed edge storage nodes such that it is kept confidential from any Z=2 storage nodes. The system cost parameters are as follows: $C_T$, the initial cost for accessing the data stored at each storage, is equal to $C_T$=9, and $C_d$, the cost for transmission and downloading 1 MB is $C_d$=1. With these system parameters, the optimum number of storage nodes to be used for storing data F that minimizes the overall system cost is calculated as N*=4, using Equation (3).

Next, the set of selected storage nodes, $\mathcal{N}$ is determined. The parameter n is initialized as n=1. Initialization involves first select the N=4 edge devices with the largest available storage sizes as the set of selected storage nodes, $\mathcal{N} = \{s_1, s_2, s_3, s_4\}$, where $|s_1|$=18 MB, $|s_2|$=15 MB, $|s_3|$=10 MB, $|s_4|$=8 MB. Because $s_1$ and $s_2$ are reserved for key storage, the maximum size of file F that can be equally and distributedly stored in these storage nodes is $(N-Z)|s_N|$=16 MB, where the packet sizes stored in these storage nodes are $|P_{s_1}|=|P_{s_2}|=|P_{s_3}|=|P_{s_4}|$=8 MB. As the size of file F is larger than 16 MB, more storage nodes should be added or more memory should be allocated from the selected storage nodes $s_1, s_2, s_3, s_4$. Therefore, the operations in the "Modification" stage are next performed.

For the Modification, info=$(N-Z-n)(|s_{N-1}|-|s_N|)$=2 MB more information can be added to the distributed storage system by (i) increasing the size of each packet stored in the first 3 storage nodes by 2 MB as seen in FIG. 7, with the update $|P_{s_1}|=|P_{s_2}|=P_{s_3}|$=10 MB, or (ii) adding $N_{add}$=1 storage with $|s_5|$=info/$N_{add}$=2 MB. The first option increases the cost by $\text{cost}_{add,1}=Z(|s_{N-1}|-|s_N|)C_d$=4, as the size of $|P_{s_{Z+1}}|$ is increased by $(|s_{N-1}|-|s_N|)$=2 MB. The second option increases the cost by $\text{cost}_{add,2}=N_{add}C_T$=9, as the number of storage nodes is increased by $N_{add}=1$ in Equation (1). Therefore, the first option with lower increased cost is selected and then updates are made. Update: n should be updated as $n=n+1=2$. After making the required update, a check is made to see if the data F can be stored distributedly and securely among the selected storage nodes or not, e.g., if the condition $\Sigma_{i=Z+1}^{N}|P_{s_i}|=|F|$ is met or not. As seen in FIG. 8, $\Sigma_{i=Z+1}^{N}|P_{s_i}|=18$ MB which is still less than $|F|=24$ MB. Therefore, another round of the stages "Modification" and "Update" are repeated.

For the second round of modification, $info=(N-Z-n)$ $(|s_{N-1}|-|s_N|)$ with the updated parameters is equal to 0 and thus the first option is not available. Therefore, we go for the second option that is adding as many additional storage nodes as required such that the sum of $|s_i|$ over all added storage nodes is equal to the additional required info, i.e., $info=|F|-\Sigma_{i=Z+1}^{N}|P_{s_i}|=24-18=6$ MB. It is assumed there is an available edge device with $|s_i|=6$ MB, which is selected to be added to the set of selected storage nodes. Then, the updates regarding the set of selected storage nodes should be made, $\mathcal{N}=\mathcal{N}+\{s_i\}_{i=N+1}^{N+N_{add}}=\{s_1, s_2, s_3, s_4, s_5\}$, $N=N+N_{add}=5$. In addition, $|P_{s_i}|$, i=5, should be set as $|P_{s_5}|=|s_5|=6$ MB. As seen in FIG. 8, the condition $\Sigma_{i=Z+1}^{N}|P_{s_i}|=|F|$ is met and thus the set of selected storage nodes is finalized as $\mathcal{N}=\{s_1, s_2, s_3, s_4, s_5\}$ with $|P_{s_1}|=|P_{s_2}|=|P_{s_3}|=10$ MB, $|P_{s_4}|=8$ MB, $|P_{s_5}|=6$ MB, as shown in FIG. 8.

File Partitioning

Figure 10:
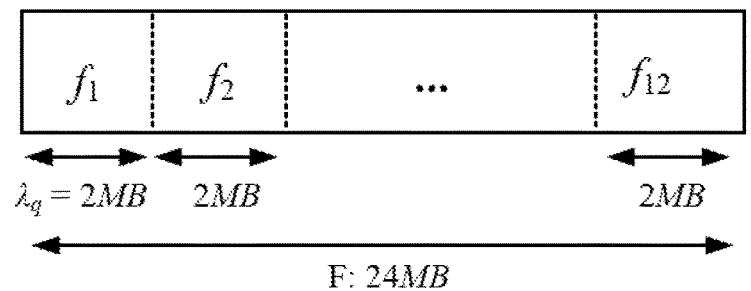

The first Z storage nodes are allocated to store the keys only, and the remaining N−Z storage nodes store the file partitions masked with keys. The file F is divided into equal partitions each with size $\lambda_q$, where $\lambda_q$ is the GCF (Greatest Common Factor) of $\{|P_{s_i}|, Z+1\leq i\leq N\}$. Therefore, each last N−Z storage nodes $s_i$ can contain $n_i=|P_{s_i}|/\lambda_q$ blocks where each block is a file partition masked with a key with size $\lambda_q$. The total required number of file partitions is equal to $L=|F|/\lambda_q$ as seen in FIG. 10.

When applied to the example storage node arrangement shown in FIG. 8, the first Z=2 storage nodes are allocated to store the keys only, and the remaining N−Z=3 storage nodes store the file partitions masked with keys. The file F is divided into equal partitions each with size $\lambda_q$, where $\lambda_q$ is the GCF of $\{|P_{s_3}|, |P_{s_4}|, |P_{s_5}|\}$, such that $\lambda_q=2$ MB. Therefore, storage nodes $s_3$, $s_4$, and $s_5$ can contain $n_3=|P_{s_3}|/\lambda_q=5$, $n_4=|P_{s_4}|/\lambda_q=4$, and $n_5=|P_{s_5}|/\lambda_q=3$ blocks, respectively, where each block is a file partition masked with a key with size $\lambda_q=2$ MB. The total number of file partitions is equal to $L=|F|/\lambda_q=12$, as shown in the block diagram of FIG. 10.

Key Generation and Constructing $g_i$'s

Figure 9:
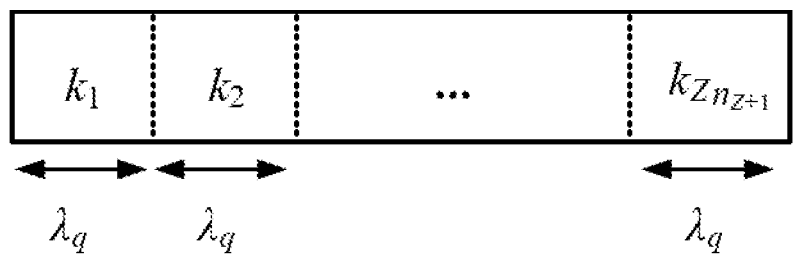
FIGS. 9-11 are diagrams showing different partitions of a data file and key generation according to example embodiments.

As mentioned before, the first Z storage nodes, store keys only. Each remaining storage node $s_i$, $Z+1\leq i\leq N$, stores $n_i$ blocks each with size $\lambda_q$, where each block includes two parts. The first part is a file partition and the second part is a function of keys. Next, the keys stored in the first Z storage nodes are constructed as well as the second parts of packets stored in the remaining N−Z storage nodes. The minimum required number of key blocks to keep data confidential from any Z storage nodes is restricted by the number of blocks stored in the storage node with the largest memory size. More specifically, $Zn_{Z+1}$ is the minimum required number of key blocks, where the size of each block is $\lambda_q$. Therefore, $Zn_{Z+1}$ random numbers in $\mathbb{F}_q$ are generated, where $q=2^{\lambda_q}$ and each generated number is put into a block as shown in FIG. 9.

Figure 11:
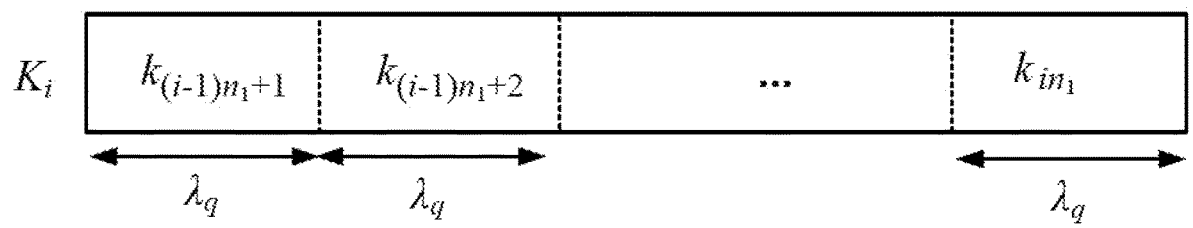

Each first Z storage node $s_i$, $1\leq i\leq Z$, stores $n_i=n_{Z+1}$ key blocks. More specifically, as will be explained in section "Packet Generation", the key packet containing the set of key blocks $\{k_j|(i-1)n_1+1\leq j\leq in_1\}$ will be stored in storage node $s_i$, $1\leq i\leq Z$ as shown in FIG. 11. In order to construct the second parts of packets stored in the remaining N−Z storage nodes, linearly independent $g_i$'s are created. More specifically, for each storage $s_i$, $Z+1\leq i\leq N$, all $g_i$'s used in all blocks should be linearly independent.

The set of $g_j$'s that are used in storage $s_{i+Z}$ is $\{g_j|(i-1)n_1+1\leq j\leq in_1\}$, therefore the first condition for constructing $g_i$'s is that $\{g_j|(i-1)n_1+1\leq j\leq in_1\}$, $\forall Z+1\leq j\leq N$ should be a linearly independent set. To satisfy this condition, each $g_j$, $(i-1)n_1+1\leq j\leq in_1$ is constructed using a different set of keys. In addition, any Z storage nodes should contain linearly independent packets. Therefore, the second condition for constructing's is that any set of $g_i$'s selected from any Z storage nodes should create a linearly independent set. In the following, the details of a method used to satisfy these two conditions in a cost-efficient way is described.

Figure 12:
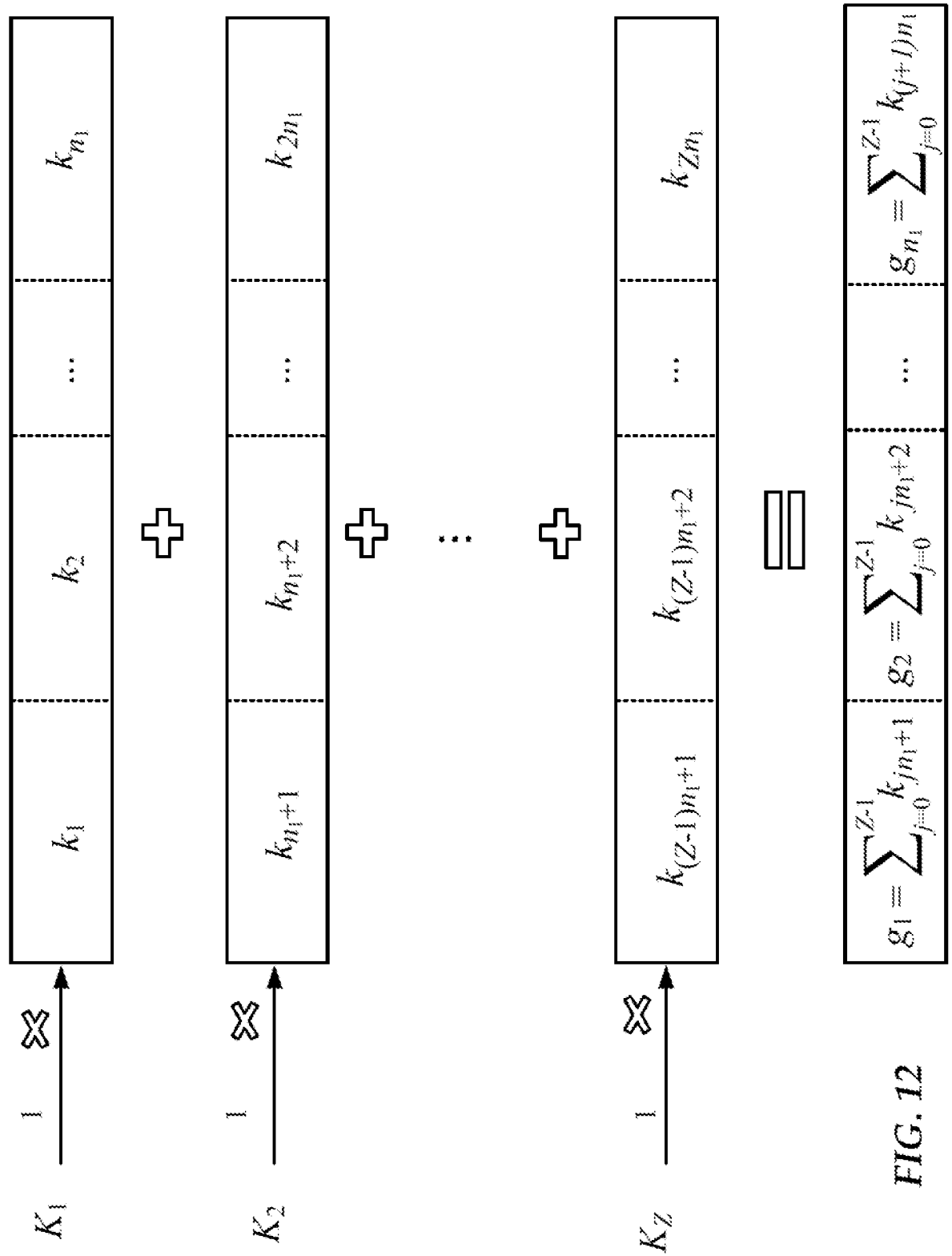
FIG. 12 is a diagram showing a linear combination of keys being formed according to an example embodiment.

The set of $g_i$'s for each storage is constructed one by one sequentially from storage $s_{Z+1}$ until the last storage $s_N$. To construct the set of $\{g_j|1\leq j\leq n_1\}$ that will be used in blocks of the packet for storage $s_{Z+1}$, linear combinations of the keys stored in the first Z storage nodes are formed. More specifically, $g_1$ used in the first block of packet $P_{s_{Z+1}}$, is constructed as a linear combination of the keys used in the first blocks of the packets $\{P_{s_i}, 1\leq i\leq Z\}$. The value of $g_2$ is constructed as a linear combination of the keys used in the second blocks of the packets $\{P_{s_i}, 1\leq i\leq Z\}$. Similarly, $g_j$, $1\leq j\leq n_1$ is constructed as a linear combination of the keys used in the $j^{th}$ blocks of the packets $\{P_{s_i}, 1\leq i\leq Z\}$. The coefficients that are used in the linear combinations are all 1s, as shown in FIG. 12.

Figures 13, 14:
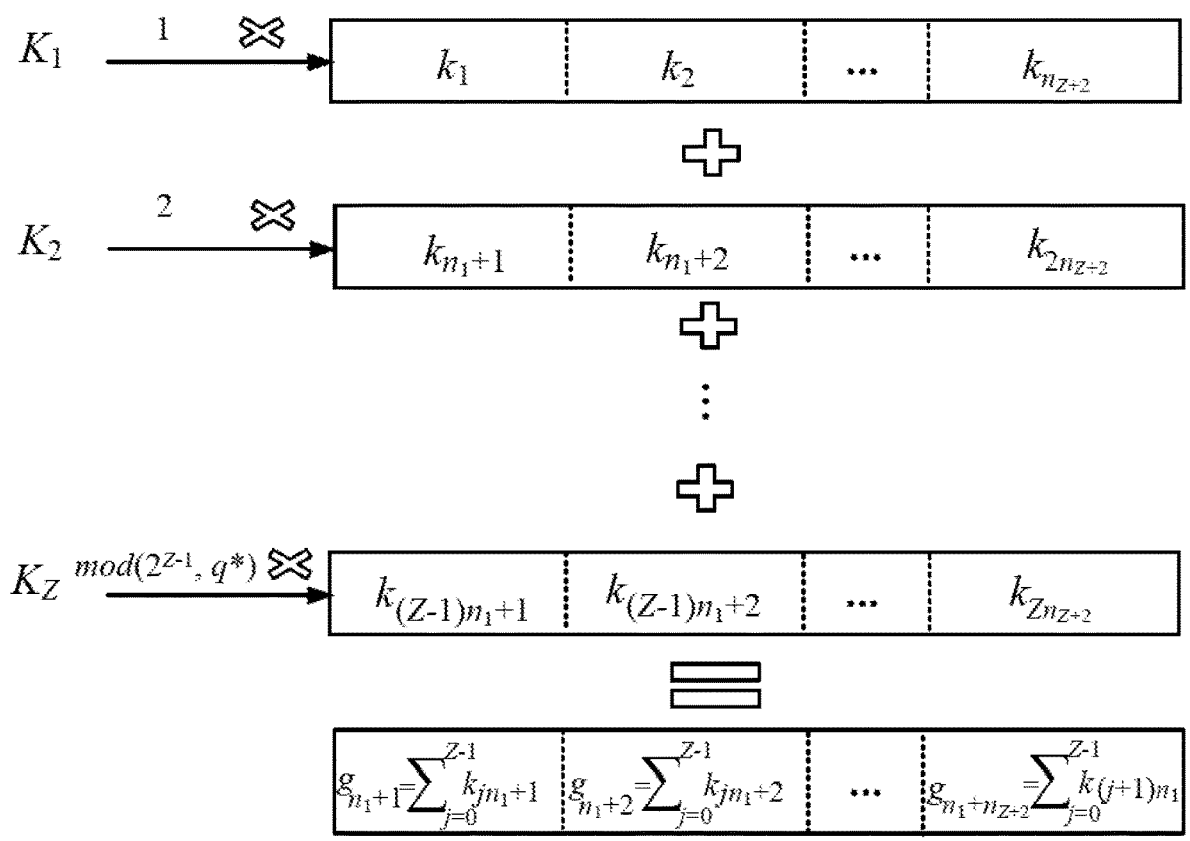
FIG. 13 is a diagram of a Vandermonde matrix used in key generation according to an example embodiment.
FIG. 14 is a diagram showing a linear combination of keys being formed according to an example embodiment.

Similarly, the set of $\{g_j|n_1+1\leq j\leq n_1+n_{Z+2}\}$ are constructed that will be used in blocks of the packet for storage $s_{Z+2}$. However, the coefficients should be selected such that the constructed $g_j$'s are linearly independent from the $g_i$'s constructed for packet $P_{s_{Z+1}}$. One way for creating linearly independent $g_j$'s, is using the Vandermonde matrix. For instance, the second row of the Vandermonde matrix shown in FIG. 13 is used as the coefficients. This takes advantage the property of the Vandermonde matrix that creates linearly independent rows if $\alpha_i\neq\alpha_j$ as for $i\neq j$. For constructing $g_i$'s for packet $P_{s_{Z+1}}$, $\alpha_1=1$ is used. In general, the $i^{th}$ row is created by setting $\alpha_i=i$.

Use of the second row of this matrix for creating $g_i$'s required for generating packet $P_{s_{Z+2}}$ is described here. The packet $P_{s_{Z+2}}$ includes $n_{Z+2}\leq n_1$ blocks, and thus only the first $n_{Z+2}$ created blocks are used for generating the required $g_i$'s to be used in $P_{s_{Z+2}}$, as shown in FIG. 14. The remaining blocks are used for generating the next $g_i$'s used in the next packets. Therefore, each row of the Vandermonde matrix is created as needed on the go. By using the previously generated blocks instead of creating new rows of Vandermonde matrix and generating new blocks, the system computation complexity will be reduced.

The Vandermonde matrix parameters, R and q* will need to be selected. The smaller the value of q*, the computational complexity for creating the linear combinations is lower. However, if the value of q* is too small, the Vandermonde matrix cannot create enough number of independent rows. Therefore, q* is selected to minimize the complexity subject to the constraint that R linearly independent rows can be created with the defined Vandermonde matrix V. Note that as many rows of the Vandermonde matrix as needed are created.

Figure 15:
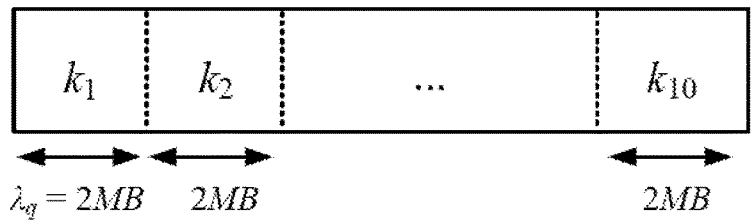
FIGS. 15 and 16 are diagrams showing key blocks according to an example embodiment.
Figure 16:
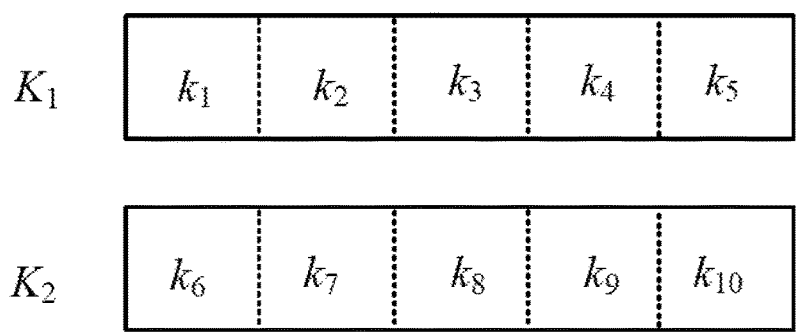
Figure 17:
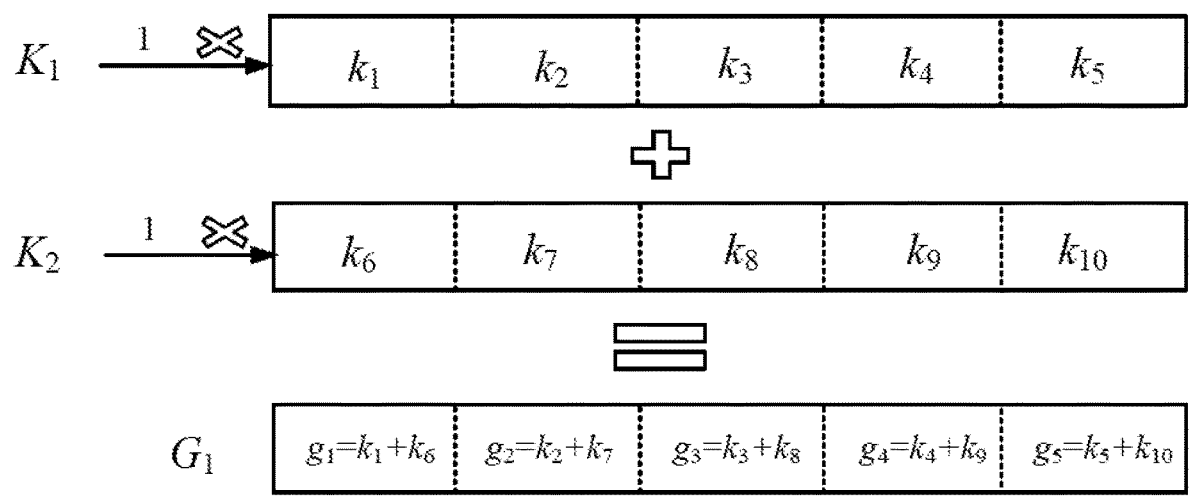
FIG. 17 is a diagram showing key combinations according to an example embodiment.

Continuing the previous example, first Z=2 storage nodes store keys only and each of the remaining storage nodes $s_3$, $s_4$, $s_5$, store blocks each with size $\lambda_q$ where each block is formed of two parts. The first part is a file partition and the second part is a function of keys. The minimum required number of key blocks to keep data confidential from any $Z=2$ storage nodes is restricted by the number of blocks stored in the storage with the largest memory size. More specifically, $Zn_{Z+1}=10$ is the minimum required number of key blocks, where the size of each block is $\lambda_q$. Therefore, 10 random numbers in $\mathbb{F}_q$ is generated, where $q=2^{\lambda_q}$ and each generated number is put into a block, as shown in FIG. 15. Each of $s_1$ and $s_2$ stores 5 key blocks. More specifically, as will be explained later, the key packets containing the two sets of key blocks $K_1=\{k_1, k_2, k_3, k_4, k_5\}$ and $K_2=\{k_6, k_7, k_8, k_9, k_{10}\}$, will be stored in storage nodes $s_1$, and $s_2$, respectively, as shown in FIGS. 4 and 17.

In order to construct the second parts of packets stored in the remaining 3 storage nodes, linearly independent $g_i$'s are created. More specifically, for each storage $s_i$, $3 \le i \le 5$, all $g_i$'s used in all blocks should be linearly independent. The set of $g_i$'s that are used in storage nodes $s_3$, $s_4$, and $s_5$ are $G_1=\{g_1, g_2, g_3, g_4, g_5\}$, $G_2=\{g_6, g_7, g_8, g_9\}$, and $G_3=\{g_{10}, g_{11}, g_{12}\}$, respectively. To keep data confidential from each storage node, each of these sets should be a linearly independent set. To satisfy this condition, for each set, different $g_i$'s are constructed using different keys. In addition, any $Z=2$ storage nodes should contain linearly independent packets. Therefore, the second condition for constructing $g_i$'s is that a set created as a union of any selected 2 storage nodes is a linearly independent set. In other words, each of the sets $G_1 \cup G_2 = \{g_1, g_2, g_3, g_4, g_5, g_6, g_7, g_8, g_9\}$, $G_1 \cup G_3 = \{g_1, g_2, g_3, g_4, g_5, g_{10}, g_{11}, g_{12}\}$, and $G_2 \cup G_3 = \{g_6, g_7, g_8, g_9, g_{10}, g_{11}, g_{12}\}$, should be a linearly independent set. In the following, the details are given of a method to satisfy these two conditions in a cost-efficient way. The $G_1$'s are constructed one by one sequentially from i=1 till i=3. To construct $G_1$, use linear combinations of the keys stored in the first 2 storage nodes. More specifically, $g_1$ used in the first block of packet $P_{s_3}$, is constructed as a linear combination of the keys used in the first blocks of the packets $P_{s_1}$ and $P_{s_2}$. $g_2$ is constructed as a linear combination of the keys used in the second blocks of the packets $P_{s_1}$ and $P_{s_2}$. Similarly, $g_j$, $1 \le j \le 5$ is constructed as a linear combination of the keys used in the jth blocks of the packets $P_{s_1}$ and $P_{s_2}$. The coefficients that are used in the linear combinations are all 1s, as shown in FIG. 17.

Figure 21:
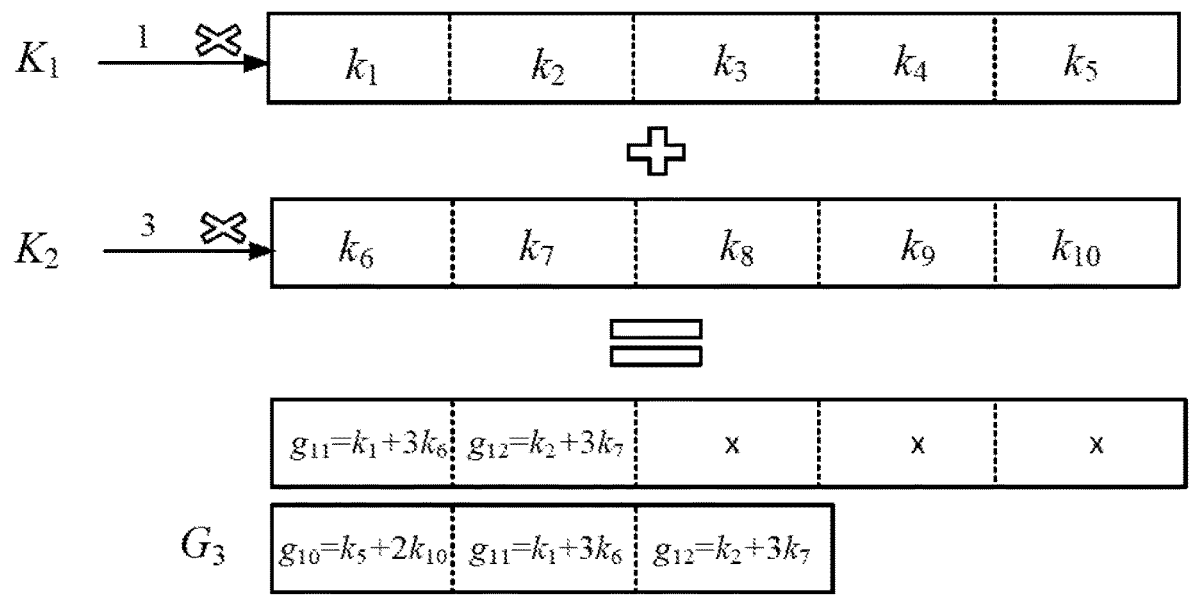

Similarly, $G_2$ is constructed for use in blocks of packets for storage $s_4$. However, the coefficients should be selected such that $G_2$ is linearly independent from $G_1$. For this purpose, Vandermonde matrix in $\mathbb{F}_7$, is defined as shown in FIG. 18, and the second row of this matrix is used as the coefficients of linear combinations. The packet $P_{s_4}$ includes 4 blocks, and thus only the first 4 created blocks are used for generating $G_2$, as shown in FIG. 19. The remaining one block will be used for generating $G_3$. The packet $P_{s_5}$ includes 3 blocks. The first block is created using the last created block from the previous constructed linear combination. The remaining two blocks are created by creating the third row of the Vandermonde matrix and calculating the linear combination of the first and the second blocks of key packets $K_1$ and $K_2$ by using the coefficients from the third row of the Vandermonde matrix, as shown in FIGS. 20 and 21.

Packet Generation

Figure 22:
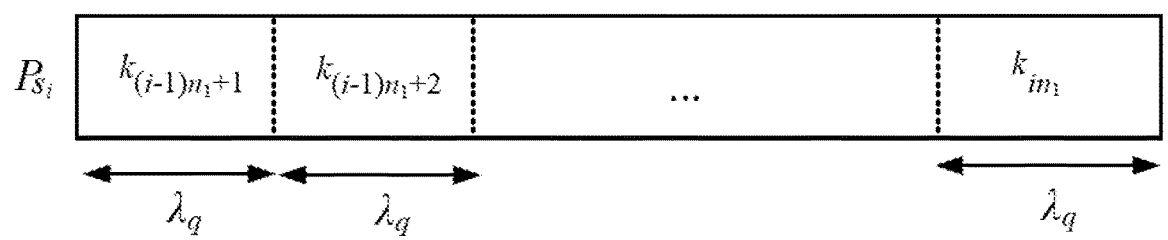

The first Z storage nodes are assigned to store keys. These are the extra bits of information that need to be stored to keep data F confidential from any Z storage nodes. More specifically, packet $P_{s_i}$ stored in storage $s_i$, $1 \le i \le Z$ is shown in FIG. 22. The remaining N–Z storage nodes store file partitions masked with keys. The goal is to generate packets such that the complexity of retrieving data F is reduced for an authorized user while the minimum requirements for privacy conditions are met. For this purpose, the packets are generated one by one from the storage $s_{Z+1}$ till storage $s_N$. Packet $P_{s_{Z+1}}$ includes $n_{Z+1} = n_1$ blocks each with size $\lambda_q$, where the $i^{th}$ block is the sum $f_i + g_i$, $1 \le i \le n_1$. Note that the summation is applied in the Galois field $\mathbb{F}_q$, where $q = 2^{\lambda_q}$ with $\lambda_q = 2$ MB, so that the generated sum can be fit into one block. Similarly, packet $Ps_{Z+2}$ includes $n_{Z+2}$ blocks each with size $\lambda_q$, where the $i^{th}$ block is the sum $f_i + g_i$, $n_1 + 1 \le i \le n_1 + n_{Z+2}$. Again the addition is in field $\mathbb{F}_q$. Subsequently, the next packets are generated by creating the required $g_i$'s as needed and apply the summation with the file partitions. The diagram in FIG. 23 shows the general packet structure for packet $P_{s_i}$, $Z+1 \le i \le N$.

Returning to the previous example, the first 2 storage nodes are assigned to store keys. This is the extra information that needs to be stored to keep data F confidential from any $Z=2$ storage nodes. More specifically, packets $P_{s_1}$, and $P_{s_2}$ stored in storage $s_1$, and $s_2$, respectively, are shown in FIG. 24. Storage nodes $s_3$, $s_4$, $s_5$ store file partitions masked with keys. The goal is to generate packets such that the complexity of retrieving data F is reduced for an authorized user while the minimum requirements for privacy conditions are met. For this purpose, the packets are generated one by one from the storage $s_3$ until storage $s_5$. Packet $P_{s_3}$ includes 5 blocks each with size $\lambda_q$, whose $i^{th}$ block is equal to the sum $f_i + g_i$, $1 \le i \le 5$. Note that the summation is applied in the Galois field $\mathbb{F}_q$, where $q = 2^{\lambda_q}$ with $\lambda_q = 2$ MB, so that the generated sum can be fit into one block. Similarly, packet $Ps_4$ includes 4 blocks each with size $\lambda_q$, where the $i^{th}$ block is the sum $f_i + g_i$, $6 \le i \le 9$. Again the addition is in field $\mathbb{F}_q$. Subsequently, the last packet is generated by the sum $fi + g_i$, $10 \le i \le 12$. This is shown in FIG. 4. It can be verified that the collective packets from any $Z=2$ storage nodes reveals no informative data about the file F.

However, there is no guarantee that by having access to the data stored in any $Z>2$ storage nodes, no partial information about file F is revealed. For instance, by having access to the data stored in the storage nodes $s_3$, $s_4$, and $s_5$, the partial information of $f_1 + f_{11} - 2f_6$ can be revealed, as the collection of (i) the $1^{st}$ block of $P_{s_3}$, (ii) the $1^{st}$ block of $P_{s_4}$, and (iii) the $2^{nd}$ block of $P_{s_5}$, are not linearly independent.

Figure 25:
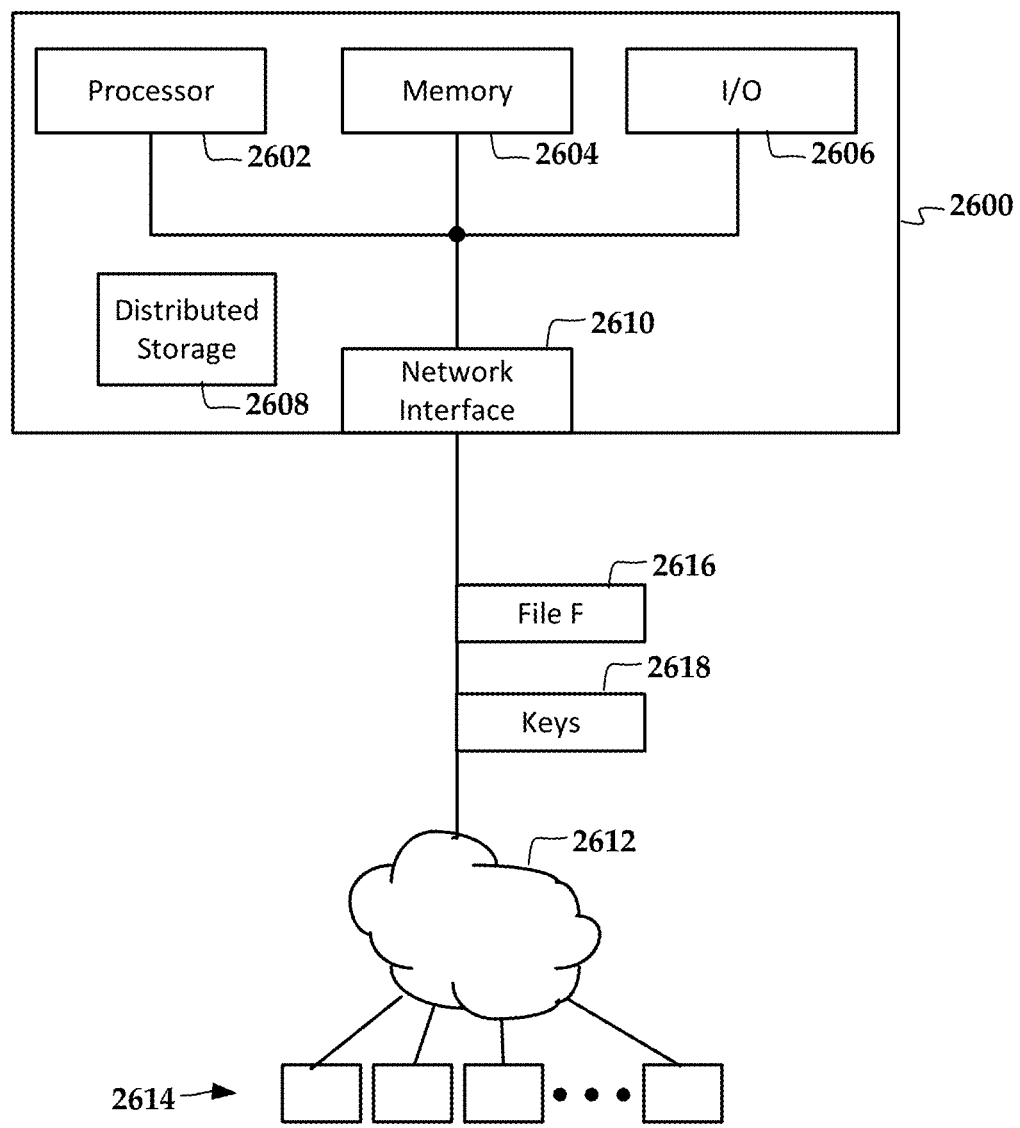
FIG. 25 is a block diagram of an apparatus according to an example embodiment.

In FIG. 25, a block diagram illustrates an apparatus 2600 according to an example embodiment. This apparatus 2600 may be configured as a user terminal as described above, although storage nodes may also have similar hardware. The apparatus includes a processor 2602 (e.g., CPU), memory 2604, and input/output circuitry 2606. The memory 2604 may include both volatile memory (e.g., RAM) and non-volatile memory (e.g., flash memory, magnetic storage) and may store instructions 2608, which in this case facilitates distributed storage via a network 2612. The apparatus 2600 has a network interface 2610 that is used for accessing the network 2612. The network 2612 includes a plurality of storage nodes 2614, e.g., edge storage nodes as described above.

The instructions 2608 are operable to cause the processor 2602 to select a value Z (e.g., selected by a system designer via the apparatus) such that an attacker having access to Z of the storage nodes 2614 is unable to decode a file 2616 of size F stored in the network 2612 that distributedly stores the file in more than the Z storage nodes. The instructions 2608 cause the processor 2602 to select N* of storage nodes that minimizes a cost function that includes |F|, Z, an initial data access cost $C_T$, and a transmission and downloading cost $C_d$. The instructions 2608 cause the processor 2602 to initially allocate equal memory sizes from largest (with the largest available capacity) N* storage nodes to store the file and a set 2618 of linear code keys.

The instructions 2608 cause the processor 2602 to iteratively determine a first cost of adding more storage nodes to N* storage nodes and a second cost of allocating more memory from each of the N* storage nodes. Based on a minimal cost determined from the iterative determinations, the instructions 2608 cause the processor 2602 to store the file 2616 and linear code keys 2618 in N≥N* of the storage nodes, the keys 2618 stored in a first through $Z^{th}$ storage nodes and independent linear combinations of the keys 2618 and partitions of the file 2616 stored in a $Z+1^{th}$ to $N^{th}$ storage nodes.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method of distributedly storing a file of size |F| in a system of networked storage nodes, the method comprising:
    selecting, by a system designer, a value Z that is a security parameter for distributedly storing the file in N storage nodes of the system, wherein Z<N and wherein the file and Z linear code keys are stored in N packets that are each stored in a different one of the N storage nodes, wherein at least two of the N storage nodes allocate different sizes of memory for storing the file, the N storage nodes being ordered from a largest storage capacity at a first storage node to a smallest capacity at an $N^{th}$ storage node, the linear code keys stored in a first through $Z^{th}$ storage nodes and independent linear combinations of the linear code keys and partitions of the file stored in a $Z+1^{th}$ to $N^{th}$ storage node, wherein the first through $Z+1^{th}$ storage nodes have a same allocated memory size of $|P_{S\_Z+1}|$, which is equal to a size of a largest of the partitions of the file, the largest partition of the file being stored on the $Z+1^{th}$ storage node;
    determining a lower bound on a cost by minimizing a cost function that includes N, $|P_{S\_Z+1}|$, |F|, Z, an initial data access cost $C_T$, and a transmission and downloading cost $C_d$, the lower bound determining N*, which is an optimum value for N that minimizes the lower bound;
    initially allocating equal memory sizes from N* of the storage nodes with a largest available storage sizes to store the file and a set of linear code keys;
    based on determining more memory is required than available in the initial allocation of the N* storage nodes, iteratively determining a first cost of adding more storage nodes to the N* storage nodes and a second cost of allocating more memory from a subset of the N* storage nodes; and
    defining N≥N* based on a minimal cost determined from the iterative determinations, and storing the file and linear code keys in the N storage nodes.

2. The method of claim 1, wherein an amount of memory available at each of the storage nodes is based on storage availability of each of the storage nodes, the storage availability being based on both available capacity and data transfer rate.

3. The method of claim 1, wherein creating the independent linear combinations of the linear code keys and the partitions comprises determining coefficients of the independent linear combinations based on rows of a Vandermonde matrix.

4. The method of claim 1, wherein the cost function comprises $NC_T + (Z|P_{S\_Z+1}| + |F|) C_d$.

5. The method of claim 1, wherein N* is selected according to $$\sqrt{\frac{Z|F|C_d}{C_T}} + Z$$

rounded to an integer.

6. An apparatus, comprising:
    a network interface operable to access the system of networked storage nodes of claim 1;
    a processor coupled to the network interface and operable via instructions that cause the processor to perform the method of claim 1.

7. A method for distributedly storing a file of size |F| in N edge storage nodes that are coupled via a network and that have heterogeneous storage availability, the method comprising:
    ordering the N edge storage nodes from a largest storage availability at a first edge storage node to a smallest availability at an $N^{th}$ edge storage node;
    selecting, by a system designer, a security parameter Z<N, the first through $Z+1^{th}$ edge storage nodes being assigned a same packet size;
    storing linear code keys in the first Z edge storage nodes; and
    storing independent linear combinations of the linear code keys combined with partitions of the file in the $Z+1^{th}$ to the $N^{th}$ edge storage nodes.

8. The method of claim 7, wherein the same packet size is $|P_{S\_Z+1}|$, which is a size of a largest of the partitions of the file, the method further comprising:
    determining a lower bound on a cost by minimizing a cost function that includes N, $|P_{S\_Z+1}|$, |F|, Z, an initial data access cost $C_T$, and a transmission and downloading cost $C_d$, the lower bound determining N*, which is an optimum value for N that minimizes the lower bound;
    initially allocating equal memory sizes from the N* of the edge storage nodes with the largest available storage sizes to store the file and a set of linear code keys;
    based on determining more memory is required than available in the initial allocation of the N* storage nodes, iteratively determining a first cost of adding more edge storage nodes to the N* edge storage nodes and a second cost of allocating more memory from each of the N* edge storage nodes; and based on a minimal cost determined from the iterative determinations, selecting the value of N≥N* and selecting a non-homogeneous storage availability for each of the N edge storage nodes.

9. The method of claim 8, wherein the cost function comprises $NC_T + (Z|P_{s_{Z+1}}| + |F|) C_d$.

10. The method of claim 8, wherein N* is selected according to $$\sqrt{\frac{Z|F|C_d}{C_T}} + Z$$

rounded to an optimum integer.

11. The method of claim 7, wherein the heterogeneous storage availability is based on both available capacity and data transfer rate.

12. The method of claim 7, wherein creating the independent linear combinations of the linear code keys and the partitions comprises determining coefficients of the independent linear combinations based on rows of a Vandermonde matrix.

13. An apparatus, comprising:
a network interface operable to access the network of claim 7;
a processor coupled to the network interface and operable via instructions that cause the processor to perform the method of claim 7.

14. A method of determining a value N for storing a file into N packets that are each stored on one of N storage nodes that have heterogeneous storage availability, a first subset of the N packets used to store linear code keys and a second subset of the N packets used to store independent linear combinations of the linear code keys combined with partitions of the file, the method comprising:
determining a lower bound a cost function that includes:
an initial data access cost part that increases with N; and
a transmission and downloading cost part that decreases with N; and
determining an optimum value for N that minimizes a lower bound of the cost function.

15. The method of claim 14, wherein the initial data access cost part of the cost function comprises $NC_T$, and the transmission and downloading cost part of the cost function comprises $$\left(\frac{Z|F|}{N-Z} + |F|\right) + C_d,$$

wherein $C_T$ is an initial data access cost, $C_d$ is a transmission and downloading cost, Z is a number of the first set of packets used to store the linear code keys, and |F| is a size of the file.

16. The method of claim 14, further comprising:
initially allocating equal memory sizes from N* storage nodes to store the first and second set of the packets;
based on determining more memory is required than available in the initial allocation of the N* storage nodes, iteratively determining a first cost of adding more storage nodes to the N* storage nodes and a second cost of allocating more memory from a subset of the N* storage nodes; and
based on a minimal cost determined from the iterative determinations, selecting the value of N≥N*.

* * * * *